March 8, 1938.  R. B. MILLER  2,110,808
AUTOMOBILE WHEEL
Original Filed May 19, 1931   2 Sheets-Sheet 1
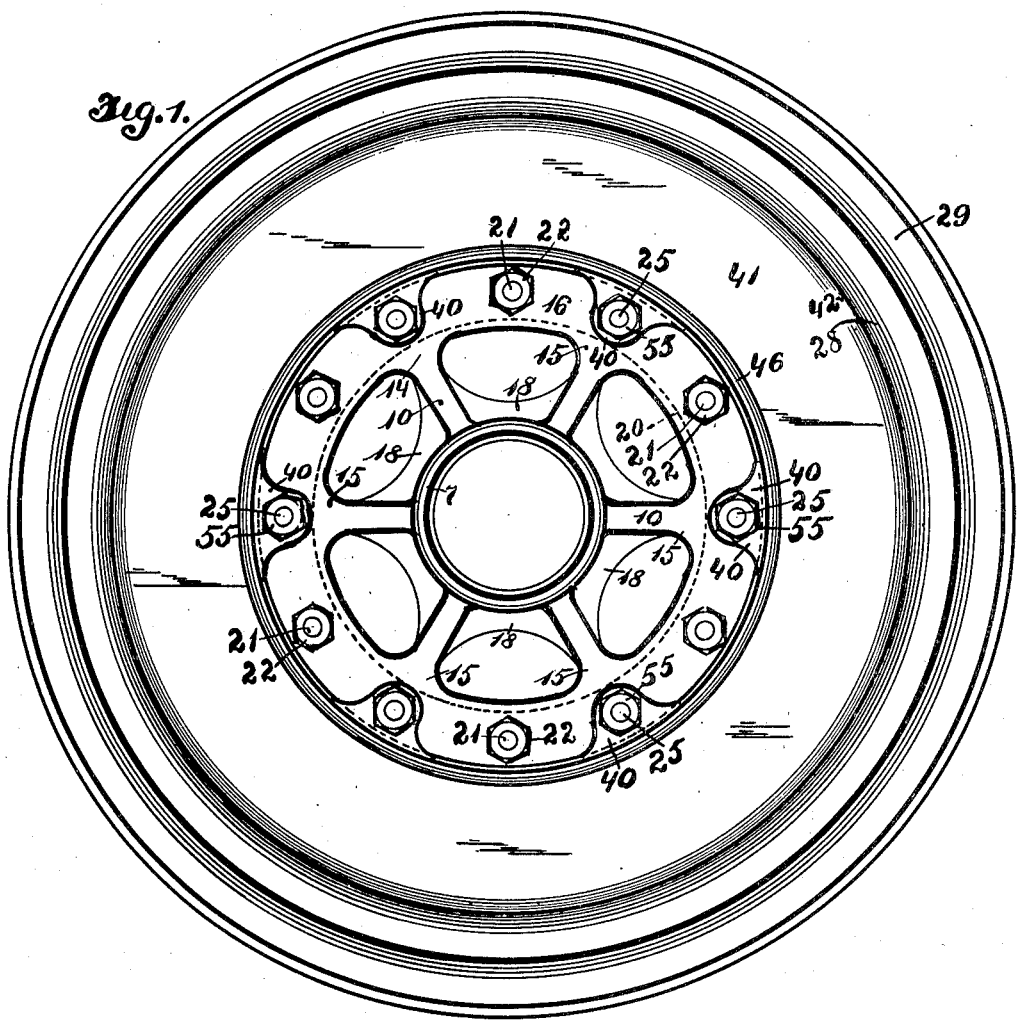
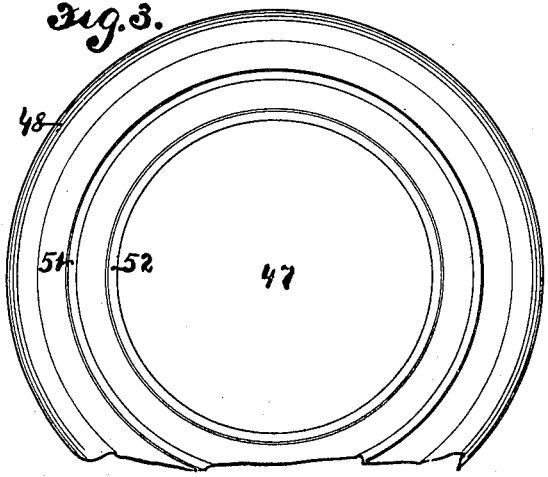

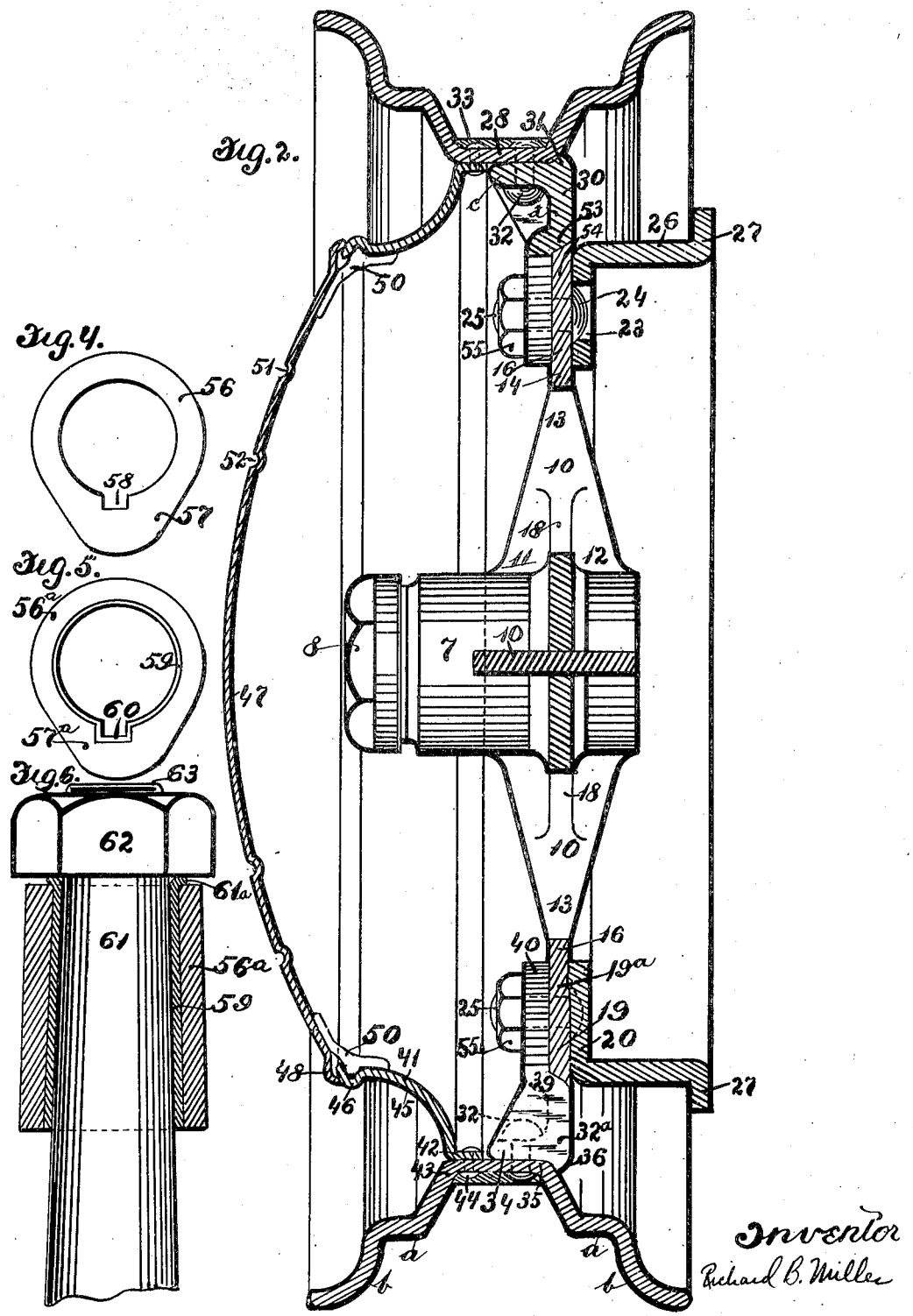

Patented Mar. 8, 1938

2,110,808

UNITED STATES PATENT OFFICE 2,110,808

AUTOMOBILE WHEEL

Richard B. Miller, Brooklyn, N. Y., assignor, by mesne assignments, of fifty percent to Bernice Miller, Cleveland Heights, Ohio, and fifty percent to Florence R. Miller, Brooklyn, N. Y.

Application May 19, 1931, Serial No. 538,459
Renewed July 20, 1936

11 Claims. (Cl. 301—9)

This invention relates to wheels for motor vehicles and more particularly to motor vehicle wheels of the all-metal type.

An object of the invention is to provide a metal wheel assembly for motor vehicles the parts of which may be economically cast, forged and rolled or stamped and which parts when assembled into a unitary structure result in a strong metal wheel having beauty of design while at the same time being of such lightness in weight as to readily adapt it for light duty or passenger vehicles.

Another object of the invention is to provide a metal wheel for both light and heavy duty vehicles, and particularly for light duty vehicles, which may be readily adapted to the low pressure type of tire and which simulates when viewed from the exterior an enlarged hub shell while at the same time embodying interior parts which are light yet strong and rugged and capable of withstanding maximum lateral and torque stresses with a minimum of metal fatigue and wear.

Another object of the invention is to provide an all-metal wheel for motor vehicles whose interior is hollow and self-ventilating throughout while at the same time being well braced against torque and lateral stresses, and whose exterior simulates in effect an enlarged hub shell or stamping.

Another object of the invention is to provide an all-metal wheel for motor vehicles embodying an interior wheel-supporting nave member, which may be cast or forged as an integral unit, and a rim-carrying assembly demountably secured to said member, together with an exterior shell assembly which imparts a finished, symmetrical contour to the wheel and which may be in part readily removed to expose the demountable elements for the rim-carrying assembly.

Another object of the invention is to provide an all metal wheel for motor vehicles whose interior is self-ventilating throughout while at the same time being well braced by integral means and a brake-drum flange having a short attaching flange fastened to the peripheral portion of the brake-drum wall of the wheel-supporting nave member thereof, against torque and lateral stresses, and whose outward contour simulates in effect an enlarged approximately frusto-conical stamping.

Another object of the invention is to provide an all metal wheel for motor vehicles embodying an interior wheel-supporting hub member having a radial wall, and a rim-carrying assembly demountably secured to said radial wall, together with an outboard shell assembly comprising an annular laterally-outwardly extended and laterally-angularly arched relatively short body secured to the inner face of the outboard-side of the rim base and terminating in an annular radial flange defining a large central opening, and a diametrally large decorative laterally-outwardly contoured cap having snapping-with means, which shell assembly imparts a smooth, finished symmetrical contour to the wheel thus excluding the employment of bolts and nuts to hold the said short body and said cap together, and which cap may be readily removed to expose the demountable elements for the tire-rim-carrying assembly.

The foregoing and other objects and advantages will become apparent in view of the following description taken in conjunction with the drawings, wherein:

Figure 1 is a view in outboard side elevation of a wheel constructed in accordance with the features of the invention, the nave-covering shell being removed to show the interior parts;

Fig. 2 is a view in transverse section taken substantially through the central part of the wheel;

Fig. 3 is a detail elevational view of the nave-covering shell;

Fig. 4 is an end view of the hub of the nave-member showing a method of reinforcing the latter when used with a drive axle;

Fig. 5 is a view similar to Fig. 4 of a modified form; and

Fig. 6 is a longitudinal sectional view of the hub of Fig. 5.

The main components of the wheel comprise a central wheel-supporting nave member, a demountable rim carrying assembly, a brake drum, and an outboard shell assembly.

First referring to the central wheel-supporting or nave member, the numeral 7 designates a hub barrel provided at the end thereof with the conventional axle nut or grease retainer 8. Projecting radially from the periphery of said hub are a plurality of ribs, generally indicated at 10. At their base portions, these ribs are transversely extended as at 11 and 12, and taper radially as indicated at 13. At their radially outer ends 14, the said ribs are provided with reinforcing side fillets or webs 15, which serve to strengthen said member against torque stresses at this point, while at their base portions, said ribs are provided with fillets or webs 18 which span the ribs and also function to reinforce said nave member against torque stresses, both the fillets 15 and 18 serving in general to strongly reinforce the spider like nave member. The outer ends 14 of the ribs 10 merge into the base portion 16 of a disk like wheel-supporting wall to constitute an annular flange having a central body portion 19a and a peripheral portion 19 which terminates in a beveled peripheral seat 54.

This wheel-supporting nave member is so constructed that it may be readily cast or forged as an integral unit, and due to its open spider like construction, said member is relatively light in weight while at the same time being strongly reinforced against torque and lateral stresses.

While any type of brake drum may be used, the particular construction of the nave member adapts itself more readily to a brake drum of the reduced web type. This type of drum may be cast rolled or otherwise formed of high carbon steel without sacrificing economy in production. The drum, as shown, comprises the relatively short attaching web or flange 20, the transverse brake-contacting body portion 26 which terminates in a radial flange 27. The web 20 is secured to the body portion 19a of the disk like wheel-supporting wall by means of bolts 21 and nuts 22. At spaced points, said drum is also provided with openings 23 to accommodate the heads 24 of mounting or locking bolts 25. If desired, these holes 23 may be substituted by countersunk openings and the locking bolts 25 made to perform the double duty of attaching the drum to the wheel-supporting member and also for mounting the rim-carrying assembly, to be described. It will be seen that by securing the relatively short web or flange 20 of the brake drum to the peripheral wall of the wheel-supporting nave member, which wall also supports the rim assembly, the structure is strongly reinforced and rendered rigid at this point, and which constitutes an essential feature to form a strong periphery for supporting vehicle load.

While any type of rim may be used, I prefer to use the drop center type of rim comprising the transverse base 28 and side flanges which are offset as indicated at a, b to accommodate the conventional type of balloon and super-balloon low pressure tire. Rim-supporting brackets, generally indicated at 30, are employed to mount the rim on the wheel-supporting nave member, said brackets being formed with a transverse head 31 which terminates in a toe portion c. This portion of the bracket is preferably permanently secured to the face of the inboard-side of the base 28 of the rim by means of rivets 32 or analogous fastening means, a covering strip 33 being applied over the base of the rim to prevent abrasion of the inner tube of a tire. By referring to the lower portion of Fig. 2, it will be noted that these brackets are provided with transverse side webs 32a which harbor the heads of the rivets 32, as indicated at d. These transverse head portions of the brackets 30 are shaped to provide a seat for the base of a tire rim as indicated at 34, said seat at its inboard side terminating in a radially tapered stop shoulder 36, against which the portion 35 of the rim base is wedged. The radially inwardly extending portions of the brackets 30 are transversely offset as at 39 and beveled as at 53 to provide a seat for engagement with the tapered seat 54 formed on the periphery of the main wheel-supporting nave member, and inwardly from this offset portion said brackets each terminate in a bolting-on or mounting lug 40.

It will be seen that this rim mounting assembly together with the rim itself is light in weight yet relatively rugged in construction, and when the brackets are seated on the periphery of the wall 19 of the main wheel-supporting member, the load is transmitted in a substantially straight line through said brackets, wall, ribs 10, to the hub barrel 7.

To protect the entire wheel-supporting and mounting assembly, also to lend beauty of design to the wheel as a whole without adding materially to the weight thereof, I provide an outer shell assembly which in the form shown consists of an annular protecting shell generally indicated at 41 and formed with a peripheral attaching flange 42 which is preferably permanently secured to the face of the outboard side of the base 28 of the rim at 43 by means of rivets 44 or analogous fastening means. The body portion of the shell 41 is preferably given a concave contour as at 45, and at its outboard extremity said shell terminates in a short radial snap-on bead or rounded portion 46 which defines a diametrally large central opening and is adapted for removable engagement with a cap member for closing the latter. While this shell member may be produced in any desired manner, I prefer to form said member by the rolling and curling or stamping process. The shell may be made of sheet metal of relatively light gauge since there are no load strains carried by said shell. Fitting into and finishing off the contour of the shell 41 is a nave covering cap or shell, generally indicated at 47. This cap or shell has its peripheral edge beaded or inturned as at 48 for wedging engagement with the portion 46 of the shell 41, and to provide means whereby the cap or shell 47 may be snapped onto the shell 41, I preferably weld or otherwise secure to the cap or shell 47 a plurality of snap brackets or hook members 50 which are adapted to engage in the side of or the groove defined by the bead 46. The cap or shell 47 may be provided with annular grooves or like decorative configurations as indicated at 51 and 52. This cap or shell 47 may be economically produced from sheet metal or the like and together with the shell 41 lends symmetry and beauty of design to the wheel as a whole.

It is the objective, as shown, to provide a light, thoroughly ventilated wheel assembly having particularly a brake contacting member provided with a short attaching flange which is adapted to be fastened to the periphery of the load-supporting member for strengthening the portion thereof which is engaged with the brackets of the tire-rim to adequately support load. In connection with strength of the entire wheel assembly it is essential, from a commercial standpoint, to provide the outboard demountable rim and shell assembly of a light, decorative outboard-side contour.

To meet the above stated requirements, the load-supporting member is of open skeleton type braced by integral means and reinforced by the brake-contacting member 20 forming a permanently fastened part thereof, and the demountable structure is of a light laterally-outwardly contoured type, the central member of which is adapted for removal to expose the interior of the entire assembly.

The shell member 41, as is obvious, is of a diameter as to extend the full diameter of the inner face of the rim-base 28 for enclosing the load-supporting member in connection with the central detachable cap member 47, to prevent ingress of foreign matter into the interior and complete the symmetry of the wheel assembly. The diametral wall of the shell member is short, formed with the transverse laterally-inwardly extended flange 42 which is fastened to the inner face of the outboard side of the rim-base for the purpose of completing the rim assembly, and the outboard side radial, short portion 46 which defines the diametrally large central opening in the shell, is for the purpose of engagement with the central cap 47 to provide a smooth, decorative contour without resorting to employing bolts and nuts to lock the shell 41 with the cap 47, and avoiding exterior projections to extend laterally-outwardly therefrom. The diametral wall of the shell member 41 is annular in form, extends laterally-outwardly from the outboard side of the rim, and is of a gradual reduced depth and diameter extended laterally-outwardly to form annularly a laterally-outwardly extended, radially-inwardly arched member. The cap 47 is of a diameter adapted to close the central opening in the shell 41, and forms a laterally contoured member.

When it is desired to demount the rim assembly from the main wheel-supporting member, it is only necessary to remove the shell cap 47, whereupon access may be had to the lock nuts 55 for the locking bolts 25.

Figs. 4, 5 and 6 show a means of reinforcing the hub of the integral cast or forged wheel-supporting member when the wheel is used with the rear or drive axle of a motor vehicle. In Fig. 4, the end of the hub barrel is indicated at 56, and adjacent the point where the axle is splined to the hub, the latter is enlarged or reinforced by a thickening of the metal as indicated at 57. The key way, by means of which the axle is splined to the hub, is indicated at 58.

Figs. 5 and 6 show a slight modification in structure. In this instance, the hub is enlarged as at 57a and in addition is further reinforced by a hardened wear sleeve 59 which is upset at its end over the hub barrel 56a, as at 61a. The key way is indicated at 60, and the axle at 61. The conventional nut 62 is shown on the end of the axle 61.

From the foregoing, it will be seen that I have provided an all metal wheel assembly which, while not limited thereto, is particularly adapted for light duty vehicles using the modern low pressure or exaggerated balloon type of tire. The entire central portion of the wheel is open and when the outer cap or shell 47 is applied, a chamber is formed through which air is constantly circulating when the wheel is in service on the road to thereby ventilate the wheel and dissipate heat generated by friction. When viewed from the exterior, the wheel in effect simulates the appearance of an enlarged smooth hub shell without projections extended therefrom, and since the shell 41 and cap or shell 47 may be chrome plated or painted in various designs, the wheel has beauty of appearance while the shell members may be readily replaced or removed and repainted or redecorated without disturbing the remaining parts of the wheel.

It will be understood that certain changes in structure and design may be made without departing from the scope of the invention as defined by the appended claims.

Having thus described my invention, what I desire to secure by Letters Patent is:

1. A metal wheel assembly for motor vehicles comprising an inner non-demountable supporting member formed with a transversely-extended hub barrel having a plurality of ribs projecting therefrom in spider formation and terminating in a radial peripheral flange, and an outer demountable assembly comprising a tire rim, a plurality of brackets permanently secured to said rim and demountably secured to said flange, an annular arched protecting shell also permanently secured to said rim and converging radially inwardly and transversely outwardly and covering said brackets from exterior view, and a cover member detachably associated with said shell, said cover member when removed exposing the demountable portions of said brackets.

2. A metal wheel assembly for motor vehicles comprising an inner non-demountable supporting member formed with a transversely extended hub barrel having a plurality of ribs projecting therefrom in spider formation and terminating in a radial peripheral flange, and an outer demountable assembly comprising a tire rim, a plurality of brackets each of which is formed with a transversely extended head which is permanently secured to said rim and a lug which is demountably secured to said flange, said lugs being contoured to fit the periphery of said radial flange, an annular arched protecting shell also permanently secured to said rim and converging radially inwardly and transversely outwardly and covering said brackets from exterior view, and a cover member detachably associated with said shell, said cover member when removed exposing the lug portion of said brackets.

3. A metal wheel assembly for motor vehicles comprising an inner non-demountable supporting member formed with a transversely extended hub barrel having a plurality of ribs projecting therefrom in spider formation and terminating in a radial peripheral flange, said ribs being transversely and radially braced and tapering outwardly toward said flange, and an outer demountable assembly comprising a tire rim, a plurality of brackets each of which is formed with a transversely extended head which is permanently secured to said rim and a lug which is demountably secured to said flange, the body portion of said bracket being transversely offset and resting directly on the periphery of said flange whereby the weight of the wheel is imposed in a straight line through said flange and ribs on said hub barrel, an annular arched shell also permanently secured to said rim and converging radially inwardly and transversely outwardly and covering said brackets from exterior view, and a cover member detachably associated with said shell.

4. A metal wheel assembly for motor vehicles, comprising an inner non-demountable supporting member formed with a transversely extended hub barrel having a plurality of ribs projecting therefrom in spider formation, said ribs being formed with a transversely and radially extended base portion and tapering radially and terminating in a radial disk-like flange formed with a beveled periphery, and an outer demountable assembly comprising a tire rim, a plurality of brackets each of which is formed with a transversely extended head which is permanently secured to said rim and a lug portion which is demountably secured to said flange, the intermediate portion of said lug being transversely offset and resting directly on the beveled periphery of said flange whereby the weight of the wheel is transmitted in a straight line through said flange and ribs to said barrel, and a shell member having a peripheral flange which is also permanently secured to said rim and a radially inwardly arched body which is extended transversely outwardly and covers said brackets from exterior view, and a cover member detachably associated with said shell.

5. In a wheel assembly for motor vehicles, an inner non-demountable supporting member formed with a transversely extended hub barrel having a plurality of ribs projecting therefrom in spider formation, said ribs being transversely and radially extended at the bases thereof and tapering radially and terminating in a peripheral flange which extends for the greater portion of the wheel diameter, said flange being formed with a beveled periphery, and an outer demountable assembly comprising a tire rim, a plurality of relatively short brackets each of which is formed with a transversely extended head, headed rivets passed through said head and anchored in the base of said rim for permanently securing the brackets thereto, the radially inner extremity of each bracket being formed with a lug which is demountably secured to said flange and the body portion of said bracket being formed with side webs which harbor the head of a rivet and brace said brackets against weight stresses and shocks imposed thereon through travel of the wheel on the road, the intermediate portion of each bracket being transversely offset and resting directly on the beveled periphery of said flange whereby the weight of the wheel is transmitted through said flange and ribs directly to said hub barrel, an annular shell having a flanged portion which is permanently secured to said rim and a radially inwardly arched body portion which is transversely outwardly extended and covers said lugs from exterior view, and a cover member detachably associated with said shell.

6. The combination of a vehicle member demountably carrying a plurality of mounting members, a drop-center tire-rim provided with a base member and inclined sides carrying tire-bead seating portions, the radially outer ends of said mounting members being permanently attached to the inboard side of said rim-base member, an annular member embodying an inboard-side axially-inwardly extending flange permanently attached to the outboard side of the base member and a gradually-radially reduced axially-outwardly extended body formed with an annular outboard radially-inwardly extended flange defining the central opening thereof, and a detachable cover member engaged with said flange to complete the outboard side of the annular member.

7. The combination of a vehicle member demountably carrying a plurality of bolted-on mounting members, a drop-center tire-rim provided with a base member and inclined sides carrying tire-bead seating portions, the radially outer ends of said mounting members being permanently attached to the inboard side of said base member, an annular flange having an axially-inwardly extended flanged portion permanently attached to the outboard side of said base member and a body of a diameter smaller than the diameter of said flanged portion and a radially-inwardly extending flanged portion which defines the central opening thereof, and a cover member, said cover member embodying a portion lying adjacent to and abutting said last flanged portion including securing means mounted on the body of the cover member separably engaging with the last mentioned flanged portion of the annular flange.

8. In combination with a vehicle member, an outer demountable wheel assembly comprising a drop-center tire-rim provided with a base member and inclined sides carrying tire-bead seating portions, bolting-on means extending from the inboard side of said base member radially for demountable association with the vehicle member, an annular axially extending pressed sheet metal member telescoped within and permanently attached to the outboard side of the base member and having a radial flange portion defining its central opening which is of a diameter sufficiently great to expose the radial body of said bolting-on means, and a cover member embodying securing means adapted for detachable engagement with the radial flange of the annular sheet metal member to complete the structure.

9. The combination with a vehicle member, of a demountable wheel member comprising a drop-center tire-rim provided with a base member and inclined sides carrying tire-bead seating portions, bolting-on means permanently attached to the inboard side of the base member and having radially inner engaging means adapted for demountable engagement with said vehicle member, an annular axially extending pressed sheet metal member telescoped within and secured to the outboard side of the base member and having an engaging portion defining the central opening thereof, and a cover member demountably engaged with the portion defining said central opening, to complete the structure.

10. The combination of a drop-center rim having radially extending brackets secured to the inner periphery of the drop center portion of the rim at the axially inner side of said portion, an annular transversely arched shell extending radially-inwardly and axially-outwardly from the rim and having at its axially inner end an axially extending flange secured to the inner periphery of the drop center portion of the rim, and a cover member detachably secured to the axially outer end of said shell, said brackets having openings radially-inwardly of said shell for bolts adapted to secure said rim demountably to an inner wheel member.

11. In combination with a vehicle member, a demountable wheel member comprising a tire-rim provided with a base member, an annular radially inwardly and axially outwardly extended pressed shell member having a body of relatively short radial extent including an axially inner flange permanently attached to the outboard-side of said rim base member and an engaging portion defining the central opening thereof, a relatively diametrically large axially-outwardly pressed cover member having a peripheral portion carrying locking means, said latter locking means detachably engaging with said engaging portion to complete the structure, and means adapted for mounting the wheel member on the vehicle member.

RICHARD B. MILLER.